United States Patent
Lavach et al.

(10) Patent No.: US 7,572,862 B2
(45) Date of Patent: Aug. 11, 2009

(54) REDUCED MELT VISCOSITY RIGID POLYVINYLCHLORIDE (PVC) COMPOSITION

(75) Inventors: Mark Lavach, Allentown, PA (US); Paul Lavallee, Berwyn, PA (US); Jason Pomante, West Chester, PA (US); Wayne Ranbom, Hopewell, NJ (US); Lisa Rachwal, Harleysville, PA (US); Stephane Girois, Brignais (FR)

(73) Assignee: Arkema Inc., Philadelphia, PA (US)

( * ) Notice: Subject to any disclaimer, the term of this patent is extended or adjusted under 35 U.S.C. 154(b) by 701 days.

(21) Appl. No.: 11/053,364

(22) Filed: Feb. 8, 2005

(65) Prior Publication Data

US 2006/0175728 A1 Aug. 10, 2006

(51) Int. Cl.
C08L 27/06 (2006.01)
C08L 25/02 (2006.01)
C08L 33/06 (2006.01)
B29C 47/00 (2006.01)

(52) U.S. Cl. .................. 525/239; 525/191; 525/227; 525/241

(58) Field of Classification Search .............. 525/227, 525/191, 239
See application file for complete search history.

(56) References Cited

U.S. PATENT DOCUMENTS

| 3,833,686 | A | * | 9/1974 | Grochowski | 525/80 |
|---|---|---|---|---|---|
| 4,179,479 | A | * | 12/1979 | Carter, Jr. | 525/66 |
| 5,376,718 | A | * | 12/1994 | Yada | 524/409 |
| 5,385,173 | A | * | 1/1995 | Gargiulo | 138/98 |
| 5,612,413 | A | * | 3/1997 | Rozkuszka et al. | 525/85 |
| 6,187,868 | B1 | * | 2/2001 | Backman et al. | 525/222 |
| 6,348,512 | B1 | * | 2/2002 | Adriani | 521/85 |

FOREIGN PATENT DOCUMENTS

EP     530622 A1 *   3/1993

OTHER PUBLICATIONS

Murphy, J. "Additives for Plastics Hanbook (2nd Edition)" Elsevier, published in 2001 (Chapter 16 provided).*

* cited by examiner

Primary Examiner—Irina S Zemel
Assistant Examiner—Jeffrey Lenihan
(74) Attorney, Agent, or Firm—Thomas F. Roland

(57) ABSTRACT

The invention relates to a process aid for use in rigid thermoplastic compositions, and especially in rigid polyvinylchloride (PVC) compositions. The process aid is an acrylic terpolymer of methylmethacrylate, butyl acrylate and styrene at an optimal ratio to produce a significant reduction in melt process viscosity. The resulting reduction in extrusion melt torques enables manufacturers of rigid PVC products to have higher throughput production rates.

6 Claims, 3 Drawing Sheets

REDUCED MELT VISCOSITY RIGID POLYVINYLCHLORIDE (PVC) COMPOSITION

FIELD OF THE INVENTION

The invention relates to a process aid for use in rigid, un-plasticized thermoplastic compositions, and especially in rigid polyvinylchloride (PVC) compositions. The process aid is an acrylic terpolymer of methylmethacrylate, butyl acrylate and styrene at an optimal ratio to produce a significant reduction in extrusion melt torque. The reduction in melt process torque enables manufacturers of rigid PVC products to have higher throughput production rates.

BACKGROUND OF THE INVENTION

Extruders of rigid PVC compounds and other thermoplastic compounds are constantly seeking ways to increase output rates through the purchase of larger extrusion equipment, the redesign of existing equipment or the redesign of formulations using new or improved additives. Improved output rates result in more economical plant operations that lead to greater profitability for the thermoplastic converters.

Thermoplastic formulations contain a variety of additives, including process aids (both conventional and lubricating), and internal and external lubricants, designed to increase throughput. Typically external lubricants and certain types of process aids, generically described as lubricating process aids, may reduce melt viscosity in PVC formulations. External lubricants, which are not soluble in the PVC formulation, coat the metallic surfaces of extrusion equipment allowing the PVC compound to slide thru the extruder, and in reality may have little affect on actual torque reduction of the compound. Reductions in "apparent torque" may be achieved by increasing external lubricant levels, however, over-lubrication using external lubricants can result in a variety of problems, from plate-out to deterioration of the extruded articles' physical properties. Lubricating process aids are typically low molecular weight polymers that have a lubricating function built into the polymer backbone. Their molecular weight approximates that of the PVC resin so torque reduction is not a function of dilution, but rather an interaction among the process aid and the rest of the formulation. Lubricating process aids typically have little affect on the physical properties of the extruded article. Generally, today's rigid PVC formulations are run without lubricating process aids. Conventional process aids are typically used in rigid PVC formulations. These typical process aids are high molecular weight polymers, with molecular weights significantly higher than PVC resin and cause increases in melt torque depending on their molecular weight.

There is a need for a process aid that reduces the extrusion torque of rigid thermoplastic formulations resulting in higher through-put.

Surprisingly, it was found that the use of an optimized lubricating process aid, having narrow ranges of methyl methacrylate, butyl acrylate and styrene, was shown to significantly reduce melt process torque in rigid PVC formulations, allowing converters of these materials to improve output rates

SUMMARY OF THE INVENTION

It is an objective of the invention to provide a process aid that significantly reduces the melt process torque of a rigid thermoplastic, and especially of rigid PVC.

It is a further objective of the invention to provide an acrylic process aid to increase throughput of a rigid PVC melt process by reducing the melt process torque without any negative effect on the physical properties of the extruded object.

The objectives of the invention are achieved, in accordance with the principles of a preferred embodiment of the invention, by a thermoplastic composition having reduced melt viscosity comprising:
 a) a rigid thermoplastic resin and;
 b) from 0.3 to 2.5 weight percent, based on the weight of the thermoplastic, of an acrylic terpolymer process aid comprising:
  1) from 41 to 44 weight percent of methylmethacrylate monomer units;
  2) from 22 to 24 weight percent of butyl acrylate monomer units; and
  3) from 33 to 36 weight percent of styrene monomer units.

The objective of the invention are further achieved by a process for increasing production throughput of rigid polyvinylchloride comprising the steps of:
 a) forming a blend comprising:
  1) a polyvinylchloride resin; and
  2) from 0.3 to 2.5 weight percent, based on the weight of the thermoplastic, of an acrylic terpolymer process aid comprising:
   (a) from 41 to 44 weight percent of methylmethacrylate monomer units;
   (b) from 22 to 24 weight percent of butyl acrylate monomer units; and
   (c) from 33 to 36 weight percent of styrene monomer units; and
 b) melt processing said blend to form an article.

DETAILED DESCRIPTION OF THE INVENTION

Figure 1:
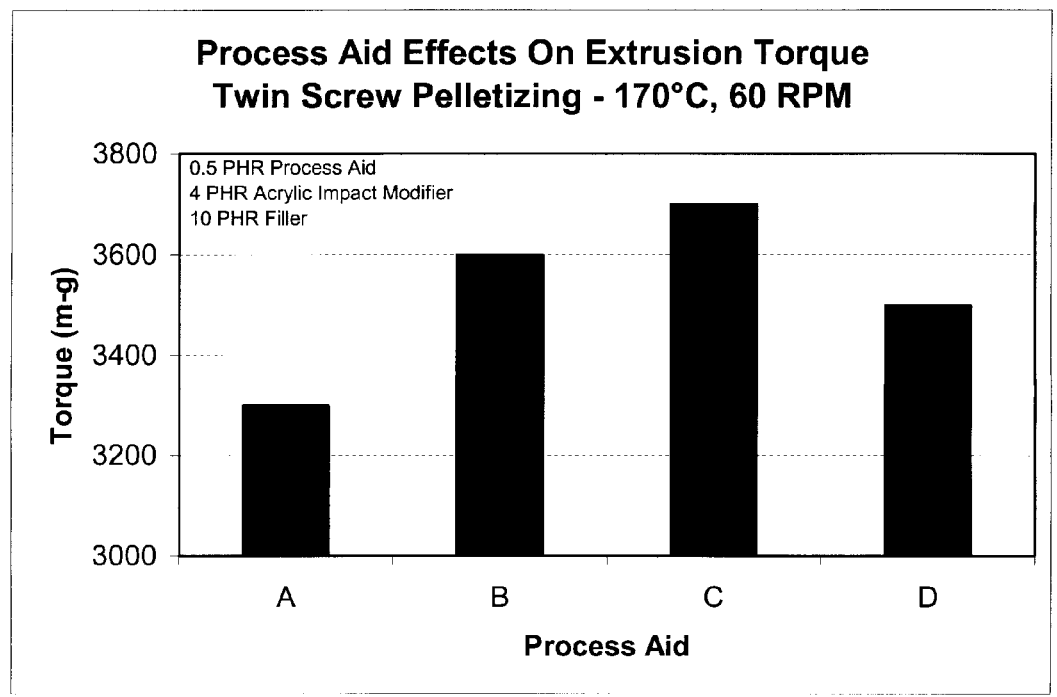
FIG. 1 plots the melt torque of the composition having the process aid of the invention compared to three commercial acrylic process aids, as seen in Table 4.

The invention relates to an acrylic terpolymer process aid capable of significantly reducing the melt viscosity torque of rigid thermoplastic formulations. By "rigid thermoplastic" as used herein means an un-plasticized thermoplastic, used to form rigid objects, such as rigid PVC. "Melt viscosity torque", "melt viscosity, and "melt process torque" are used to mean the viscosity of the rigid thermoplastic composition in the melt state, which can be measured as torque in the process equipment. The use of the composition of the invention results in significantly lower melt viscosity, which results as lower process torque compared with rigid thermoplastic compositions using other known process aids. The process aid of the invention does not negatively affect the physical properties of articles formed by the melt process.

The acrylic terpolymer process aid is a terpolymer polymerized from a monomer mixture of 41 to 44 percent by weight of methylmethacrylate (MMA), 22 to 24 percent by weight of butyl acrylate (BA) and 33 to 36 percent by weight of styrene. Optionally very small amounts of other acrylic monomers, such as ethyl acrylate, may be included in the terpolymer.

The terepolymer may be made by any conventional polymerization technique, including, but not limited to mass, bulk, solution, suspension, emulsion and inverse emulsion polymerization.

The molecular weight of the process aid of the invention is such to provide a relative viscosity in the range of from 0.10 to 0.30.

The process aid is miscible with polyvinyl chloride in the melt state.

The process aid of the invention is blended with the thermoplastic resin at from 0.3 to 2.5 and preferably from 0.5 to 1.5 by weight, based on the weight of the thermoplastic resin.

Thermoplastic resins useful in the invention include those rigid thermoplastic resins that are processed by a melt process including, but not limited to extrusion, calendaring, injection molding, and blow molding.

Thermoplastic resins useful in the present invention include, but are not limited to alkyl (meth)acrylate polymers and copolymers, acrylonitrile/butadiene/styrene terpolymers, acrylonitrile/styrene/acrylate copolymers, polycarbonates, polyesters such as poly(butylene terephthalate) and poly(ethylene terephthalate), methacrylate/butadiene/styrene copolymers, high impact polystyrene, acrylonitrile/acrylate copolymers, acrylonitrile/methyl methacrylate copolymers, polyolefins, chlorinated poly(vinyl chloride), and poly(vinyl chloride), polyamides, polyetheresteramides (PEBAX), or alloys of the abovementioned polymers. The thermoplastic polymer can also be composed of a homopolymer of a vinylidene halide, such as 1,1-dichloroethylene or 1,1-difluoroethylene.

In a preferred embodiment, the thermoplastic is PVC, chlorinated PVC, or an alloy thereof, such as PVC/butyl acrylate, used in rigid PVC applications In addition to PVC resin, PVC formulations contain a variety of additives, including but not limited to, heat stabilizers, internal and external lubricants, impact modifiers, process aids, fillers, and pigments. Typical use levels of these additives in different thermoplastic formulations is known in the art. The acrylic process aid is generally used at between 0.3 and 2.5 weight percent based on the thermoplastic, and preferably from 0.5 to 1.5 weight percent.

It has been found that the process aid of the invention is an effective melt viscosity reducer in rigid PVC formulations, which manifests itself as reduced torques and increased output rates in rigid PVC extrusion. Since torque can be directly related to the amount of material contained in the extruder at a given time, reductions in PVC extrusion torque will allow producers of PVC articles to achieve higher output rates through the addition of higher amounts of material to the extruder. It has been found that the acrylic process aid reduces viscosity more effectively than current commercial acrylic process aids. It works well in both chlorinated polyethylene impact modified PVC and acrylic impact modified PVC formulations.

The thermoplastic composition of the invention can be melt processed by known means to form an article, and is especially effective in reducing extrusion melt torque—thus increasing throughput, in processes involving a twin screw extruder.

EXAMPLES

Example 1

Acrylic Impact Modified PVC

The ingredients in Table 1 were blended in a high intensity mixer using the procedure outlined in Table 2. All formulations herein are listed in parts per hundred resin (phr). Acrylic process aids include the process aid "A" of the invention, and comparative acrylic process aids "B", "C" and "D", the compositions shown in Table A below: (MMA=methyl methacrylate, BA=butyl acrylate, ST=styrene, EA=ethyl acrylate)

TABLE A

| | Monomer Weight Percent (%) | | | | |
|---|---|---|---|---|---|
| | MMA | BA | ST | EA | Relative Viscosity |
| A | 42 | 23 | 35 | | 0.18 |
| B (comp) | 38-39 | 53-58 | 3-6 | 0-1 | 0.05-0.20 |
| C (comp) | 80 | 20 | | | 0.70-1.0 |
| D (comp) | 40 | 24 | 33 | | 0.04-0.07 |

After blending, the materials were allowed to equilibrate for a minimum of 24 hours and then analyzed using a torque rheometer for properties typical of a PVC formulation. Methods employed for torque rheometry are similar to those found in ASTM D2538. The data are shown in Table 3 and correspond to run conditions of 190° C., 75 rpm. To simulate extrusion appearance, color chips were pulled from the torque rheometer at times between 2 and 20 minutes after compound fusion. Color comparisons were made using the 6 minute chip, as this was shown to be most representative of a commercially extruded compound. These results are also shown in Table 3. Materials were then pelletized or extruded into PVC sheet using a lab twin-screw extruder. In this example, torques were measured during the pelletization process. The extruder was set up to achieve a melt temperature of 170° C. at 60 RPM. Torque data, which is a measurement of the motor load on the twin screw extruder, is shown in Table 4 and plotted in FIG. 1. The data shown in Table 4 clearly indicates a significant torque reduction over other commercial products.

TABLE 1

| | Formulation | | | |
|---|---|---|---|---|
| | A | B | C | D |
| PVC Resin (K67) | 100 | 100 | 100 | 100 |
| Organotin Stabilizer | 1.0 | 1.0 | 1.0 | 1.0 |
| Calcium Stearate | 1.2 | 1.2 | 1.2 | 1.2 |
| 165 mp Paraffin Wax | 1.0 | 1.0 | 1.0 | 1.0 |
| Oxidized Polyethylene | 0.15 | 0.15 | 0.15 | 0.15 |
| Acrylic Impact Modifier | 4.0 | 4.0 | 4.0 | 4.0 |
| Acrylic Process Aid | 0.5 | 0.5 | 0.5 | 0.5 |
| Calcium Carbonate | 10.0 | 10.0 | 10.0 | 10.0 |
| Titanium Dioxide | 0.5 | 0.5 | 0.5 | 0.5 |

TABLE 2

Blending Procedure for Formulations Listed in Table 1

Add Tin Stabilizer to PVC Resin at a temperature not to exceed 45° C. in a high speed mixer and begin heating.
At 66° C., Add Calcium Stearate, Paraffin Wax, and Oxidized Polyetheylene
At 72° C., Add Impact Modifier and Process Aid
At 88° C., Add Calcium Carbonate
At 98° C., Add Titanium Dioxide and Mix for 30 seconds and discharge

TABLE 3

Torque Rheometry Data

| | Formulation | | | |
|---|---|---|---|---|
| | A | B | C | D |
| Fusion Time | 1.1 | 1.0 | 1.0 | 0.9 |
| Fusion Torque | 2870 | 2890 | 3080 | 2870 |
| 6 Minute Color Chip (Hunter b) | 5.7 | 5.6 | 5.9 | 5.6 |

TABLE 4

Extrusion Torque Data (Pelletization)

| | Formulation | | | |
|---|---|---|---|---|
| | A | B | C | D |
| Extrusion Torque | 3300 | 3600 | 3700 | 3500 |

Example 2

Chlorinated Polyethylene Impact Modified PVC, Pelletized

Figure 2:
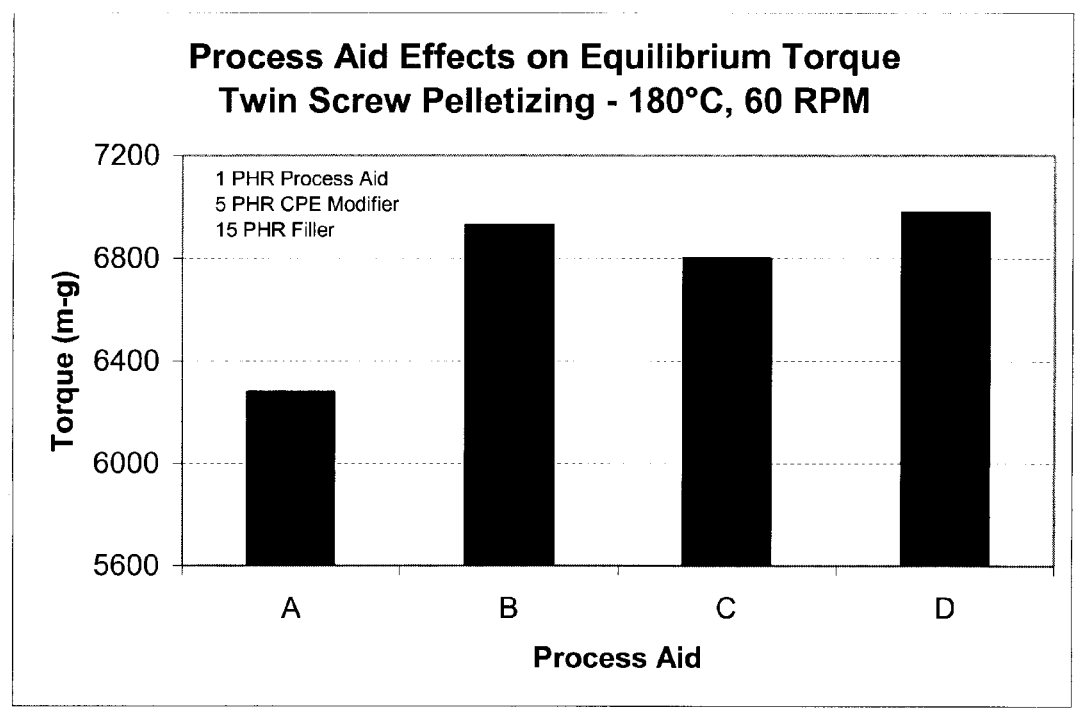
FIG. 2 plots the melt torque of the composition having the process aid of the invention compared to three commercial acrylic process aids, as seen in Table 8.

The ingredients in Table 5 were blended in a high intensity mixer using the procedure outlined in Table 6. The subject of the invention is labeled as Formulation A, while Formulations B-D are comparative materials, with Formulations B and D containing lubricating process aids. After blending, the materials were allowed to equilibrate for a minimum of 24 hours and then analyzed using a torque rheometer for properties typical of a PVC formulation. Methods employed for torque rheometry are similar to those found in ASTM D2538. The data is shown in Table 7. To simulate extrusion appearance, color chips were pulled from the torque rheometer at times between 2 and 20 minutes. Color comparisons were made using the 6 minute chip, as this was shown to be most representative of a commercially extruded compound. These results are also shown in Table 7. Fusion data was obtained at 180° C., 60 rpm; color data was obtained at 190° C., 75 rpm. Materials were then pelletized or extruded into PVC sheet using a lab twin-screw extruder. In this example torques were measured during the pelletization process. The extruder was set up to achieve a melt temperature of 180° C. at 60 RPM. Torque data, which is a measurement of the motor load on the twin screw extruder, is shown in Table 8 and in FIG. 2. The data shown in Table 8 clearly indicates a significant torque reduction over other commercial products.

TABLE 5

| | Formulation | | | |
|---|---|---|---|---|
| | A | B | C | D |
| PVC Resin (K67) | 100 | 100 | 100 | 100 |
| Organotin Stabilizer | 0.8 | 0.8 | 0.8 | 0.8 |
| Calcium Stearate | 1.2 | 1.2 | 1.2 | 1.2 |
| 165 mp Paraffin Wax | 1.0 | 1.0 | 1.0 | 1.0 |
| Oxidized Polyethylene | 0.2 | 0.2 | 0.2 | 0.2 |
| Chlorinated Polyethylene | 5.0 | 5.0 | 5.0 | 5.0 |
| Acrylic Process Aid | 1.0 | 1.0 | 1.0 | 1.0 |
| Calcium Carbonate | 15.0 | 15.0 | 15.0 | 15.0 |
| Titanium Dioxide | 0.5 | 0.5 | 0.5 | 0.5 |

TABLE 6

Blending Procedure for Formulations Listed in Table 5

Add Tin Stabilizer to PVC Resin at a temperature not to exceed 45° C. in a high speed mixer and begin heating.
At 66° C., Add Calcium Stearate, Paraffin Wax, and oxidized polyethylene
At 72° C., Add Impact Modifier and Process Aid
At 88° C., Add Calcium Carbonate
At 98° C., Add Titanium Dioxide and Mix for 30 seconds and discharge

TABLE 7

Torque Rheometry Data

| | Formulation | | | |
|---|---|---|---|---|
| | A | B | C | D |
| Fusion Time | 1.5 | 1.2 | 1.5 | 1.1 |
| Fusion Torque | 2680 | 2780 | 3010 | 2820 |
| 6 Minute Color Chip (Hunter b) | 6.3 | 6.3 | 6.5 | 5.8 |

TABLE 8

Extrusion Torque Data (Pelletization)

| | Formulation | | | |
|---|---|---|---|---|
| | A | B | C | D |
| Extrusion Torque | 6280 | 6930 | 6800 | 6980 |

Example 3

High Filler, Chlorinated Polyethylene Impact Modified PVC, Pelletized

Figure 3:
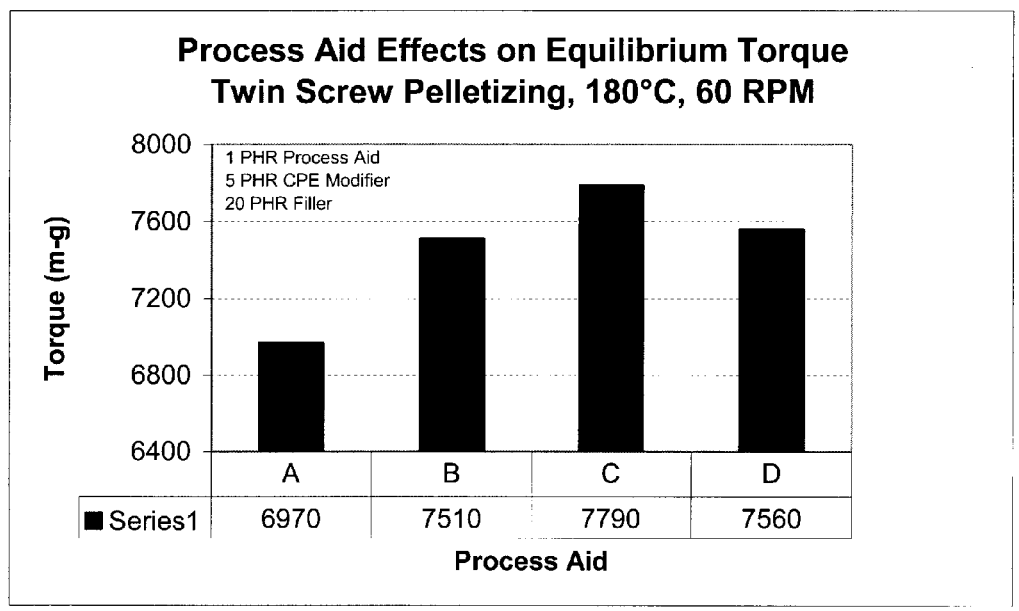
FIG. 3 plots the melt torque of the composition having the process aid of the invention compared to three commercial acrylic process aids, as seen in Table 12.

The ingredients in Table 9 were blended in a high intensity mixer using the procedure outlined in Table 10. The subject of the invention is labeled as Formulation A, while Formulations B-D are comparative materials, with Formulations B and D containing lubricating process aids. After blending, the materials were allowed to equilibrate for a minimum of 24 hours and then analyzed using a torque rheometer for properties typical of a PVC formulation. Methods employed for torque rheometry are similar to those found in ASTM D2538. The data is shown in Table 11. To simulate extrusion appearance, color chips were pulled from the torque rheometer at times between 2 and 20 minutes. Color comparisons were made using the 6 minute chip, as this was shown to be most representative of a commercially extruded compound. These results are also shown in Table 11. Fusion data was obtained at 180° C., 60 rpm; color data was obtained at 190° C., 75 rpm. Materials were then pelletized or extruded into PVC sheet using a lab twin-screw extruder. In this example torques were measured during the pelletization process. The extruder was set up to achieve a melt temperature of 180° C. at 60 RPM. Torque data, which is a measurement of the motor load on the twin screw extruder, is shown in Table 12 and FIG. 3. The data shown in Table 12 clearly indicates a significant torque reduction over other commercial products.

TABLE 9

| | Formulation | | | |
|---|---|---|---|---|
| | A | B | C | D |
| PVC Resin (K67) | 100 | 100 | 100 | 100 |
| Organotin Stabilizer | 0.8 | 0.8 | 0.8 | 0.8 |
| Calcium Stearate | 1.2 | 1.2 | 1.2 | 1.2 |
| 165 mp Paraffin Wax | 1.0 | 1.0 | 1.0 | 1.0 |
| Oxidized Polyethylene | 0.2 | 0.2 | 0.2 | 0.2 |
| Chlorinated Polyethylene | 5.0 | 5.0 | 5.0 | 5.0 |
| Acrylic Process Aid | 1.0 | 1.0 | 1.0 | 1.0 |
| Calcium Carbonate | 20.0 | 20.0 | 20.0 | 20.0 |
| Titanium Dioxide | 0.5 | 0.5 | 0.5 | 0.5 |

TABLE 10

Blending Procedure for Formulations Listed in Table 9

Add Tin Stabilizer to PVC Resin at a temperature not to exceed 45° C. in a high speed mixer and begin heating.
At 66° C., Add Calcium Stearate, Paraffin Wax, and oxidized polyethylene
At 72° C., Add Impact Modifier and Process Aid
At 88° C., Add Calcium Carbonate
At 98° C., Add Titanium Dioxide and Mix for 30 seconds and discharge

TABLE 11

Torque Rheometry Data

| | Formulation | | | |
|---|---|---|---|---|
| | A | B | C | D |
| Fusion Time | 1.6 | 1.2 | 1.5 | 1.2 |
| Fusion Torque | 2620 | 2810 | 3000 | 2790 |
| 6 Minute Color Chip (Hunter b) | 6.1 | 5.6 | 5.5 | 5.7 |

TABLE 12

Extrusion Torque Data (Pelletization)

| | Formulation | | | |
|---|---|---|---|---|
| | A | B | C | D |
| Extrusion Torque | 6970 | 7510 | 7790 | 7560 |

Example 4

Chlorinated Polyethylene Impact Modified PVC, Sheet Extrusion

The ingredients in Table 13 were blended in a high intensity mixer using the procedure outlined in Table 14. The subject of the invention is labeled as Formulation A, while Formulations B-D are comparative materials, with Formulations B and D containing lubricating process aids. After blending, the materials were allowed to equilibrate for a minimum of 24 hours. Materials were then pelletized or extruded into PVC sheet using a lab twin-screw extruder. In this example torques were measured during the sheet extrusion process. The extruder was set up to achieve a melt temperature of 180° C. at 55 RPM. Torque data, which is a measurement of the motor load on the twin screw extruder, is shown in Table 15. The data shown in Table 15 clearly indicates a significant torque reduction over other commercial products.

TABLE 13

| | Formulation | | | |
|---|---|---|---|---|
| | A | B | C | D |
| PVC Resin (K67) | 100 | 100 | 100 | 100 |
| Organotin Stabilizer | 0.8 | 0.8 | 0.8 | 0.8 |
| Calcium Stearate | 1.2 | 1.2 | 1.2 | 1.2 |
| 165 mp Paraffin Wax | 1.0 | 1.0 | 1.0 | 1.0 |
| Oxidized Polyethylene | 0.2 | 0.2 | 0.2 | 0.2 |
| Chlorinated Polyethylene | 5.0 | 5.0 | 5.0 | 5.0 |
| Acrylic Process Aid | 1.0 | 1.0 | 1.0 | 1.0 |
| Calcium Carbonate | 15.0 | 15.0 | 15.0 | 15.0 |
| Titanium Dioxide | 0.5 | 0.5 | 0.5 | 0.5 |

TABLE 14

Blending Procedure for Formulations Listed in Table 13

Add Tin Stabilizer to PVC Resin at a temperature not to exceed 45° C. in a high speed mixer and begin heating.
At 66° C., Add Calcium Stearate, Paraffin Wax, and oxidized polyethylene
At 72° C., Add Impact Modifier and Process Aid
At 88° C., Add Calcium Carbonate
At 98° C., Add Titanium Dioxide and Mix for 30 seconds and discharge

TABLE 15

Extrusion Torque Data (Sheet Extrusion)

| | Formulation | | | |
|---|---|---|---|---|
| | A | B | C | D |
| Extrusion Torque | 7770 | 7970 | 8390 | 8370 |

What is claimed is:

1. An article formed by melt-processing having a composition comprising a rigid polyvinylchloride resin; and from 0.3 to 2.5 weight percent, based on the weight of the polyvinylchloride resin, of an acrylic terpolymer process aid comprising:
   i. from 41 to 44 weight percent of methylmethacrylate monomer units;
   ii. from 22 to 24 weight percent of butyl acrylate monomer units; and
   iii. from 33 to 36 weight percent of styrene monomer units.

2. The article of claim 1, comprising 0.5 to 1.5 weight percent of said acrylic terpolymer process aid, based on the weight of the polyvinylchloride resin.

3. The article of claim 1, wherein said rigid polyvinylchloride resin is a polyvinylchloride resin, chlorinated polyvinylchloride resins, or alloys thereof.

4. The article of claim 1, wherein said rigid polyvinylchloride resin further comprises at least one impact modifier.

5. The article of claim 4, wherein said impact modifier is an acrylic impact modifier or a chlorinated polyethylene impact modifier.

6. The article of claim 1, wherein said melt processing involves extrusion in a twin screw extruder.

* * * * *